March 1, 1966 R. HERGENHAHN ETAL 3,238,322
SELF-CANCEL TURN-INDICATOR SIGNAL SWITCHES FOR
MOTOR VEHICLES HAVING FINGER MEMBERS
PIVOTALLY MOUNTED ON THE HOUSING
Filed Dec. 20, 1962
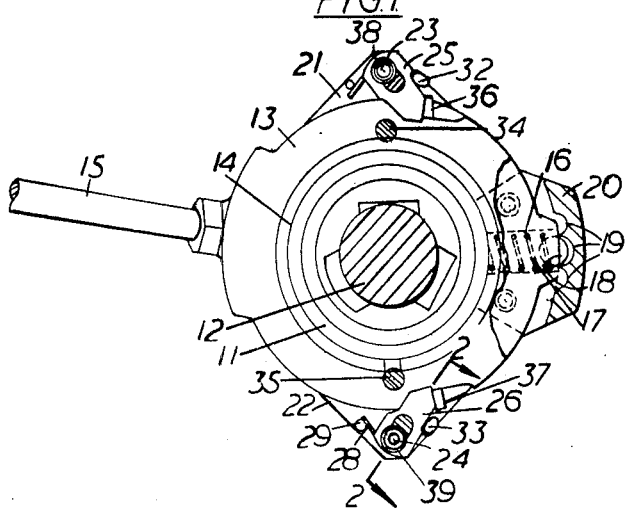
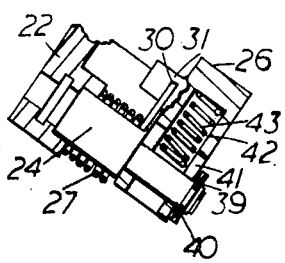
Inventors
Richard Hergenhahn
& Fritz Ewald
BY Warren D. Hill
Attorney

United States Patent Office 3,238,322
Patented Mar. 1, 1966

3,238,322
SELF - CANCEL TURN - INDICATOR SIGNAL SWITCHES FOR MOTOR VEHICLES HAVING FINGER MEMBERS PIVOTALLY MOUNTED ON THE HOUSING
Richard Hergenhahn, Russelsheim (Main), and Fritz Ewald, Mainz-Bischofsheim, Germany, assignors to General Motors Corporation, Detroit, Mich., a corporation of Delaware
Filed Dec. 20, 1962, Ser. No. 246,156
Claims priority, application Germany, Jan. 13, 1962, O 6,337; Apr. 11, 1962, O 8,682
4 Claims. (Cl. 200—61.34)

This invention relates to self-cancel turn-indicator switches for motor vehicles.

By employing simple means, the invention permits the construction of satisfactorily-operating switches in which the rotation of the vehicles steering column in the sense of the indicated change in travelling direction, is possible without appreciable resistance caused by the switch mechanism.

The scope of the invention is defined by the appended claims; how the invention may be performed is particularly described below with reference to the accompanying drawings in which:

FIGURE 1 shows a turn-indicator switch in plan;
FIGURE 2 a section along line 2—2 of FIGURE 1.

The steering column 12 is rotatably mounted in a sleeve-like housing 11 a switch ring 13 is rotatably mounted concentric with the steering column on a flange at the upper side of the housing 11 and is held down by a spring ring 14. A hand lever 15 is screwed into the switch ring 13 and is securely fixed by a nut. At the side of switch ring 13 opposite the hand lever 15, there is a radially extending bore 16 in which a helical spring 17 and a ball 18 are mounted. The helical spring 17 supports itself with one end against the bottom of the bore 16. Whilst with its other end it forces the ball 18 into an extension 20 of the housing 11 provided with notches 19. Contacts for bringing direction indicator signal lamps (not shown) into circuit can be switched by rotation of the switch ring, and these contacts co-operate with counter-contacts (also not shown) mounted on the housing. Each of two oppositely disposed projections 21, 22 of housing 11, which are not covered by the switching ring 13, mounts a pivot 23 or 24 between fingers 25, 26 respectively, are rotatably mounted on each of these pivots. The finger 26 is imparted a turning effort in clockwise direction by a helical torsion spring 27 which rests with one end 28 against a lug 29 on the housing and with its other end 30 against a lug 31 on the finger 26, whilst a turning effort in anti-clockwise direction is exerted by similar means upon the finger 25. At either side, a stop 32, 33 limits the movement of the fingers.

In the neutral or mid-position of the hand lever 15, the fingers are out of the rotational path of drive elements in the form of pins 34 and 35 participating in the rotational movement of the steering spindle 12, during rotation thereof. At the side towards which the tips of the fingers seek to move themselves, under the action of the springs 27, there are abutments 36 and 37 on the switch ring 13, each being in light contact with the finger 25 or 26 respectively, in the mid-position of the hand lever. During a rotation of the switch ring for bringing the direction indicator signal into circuit corresponding to the travel movement intended, one or other finger 25, or 26 is swung into the path of movement of the drive pins 34 and 35 by one of the two shift abutments 36 and 37. If the steering column 12 is moved further in the sense of the change in driving direction indicated by the operation of the switch ring, the particular finger yields to the impinging drive pin by a pivoting movement in opposition to the restoring force of helical spring 27. During the reverse rotation of the steering column 12 on the other hand, the finger protruding into the path of movement of the drive pins 34 and 35 is likewise displaced, but at the same time it brings the switch ring 13 back into its neutral or switch-off position, due to the abutment lying at the other side of the finger.

The fingers 25, 26 are each secured against falling out by a spring washer, 38 and 39 respectively, these being inserted in appropriate grooves 40 of the pivots 23 and 24.

At their tips, the fingers 25 and 26 are bevelled off towards both sides in order to give the driving pins 34 and 35 only a slight engaging surface in the longitudinal direction of the fingers.

The fingers 25 and 26 can also undergo a linear displacement in their longitudinal direction, against yielding resistance. For this purpose they have a slot hole 41 and a bore 42 in which a helical compression spring 43 is fitted. The latter thrusts with one end against the bottom of the bore and with the other end against the pivot 24.

If the hand lever 15 is held in a switch-on position, and the steering column 12 is turned contrary to the direction of rotation corresponding to the intended change in travelling direction, the component of force acting from the driving pin 34 or 35 upon the oblique face of the finger 25 or 26 is able to force back the latter in radial direction by overcoming the spring 43 to such an extent that the driving pin is able to pass by, should the switch ring be blocked. This eliminates the risk of dangerous jamming of the steering column as the consequence of a blocked switch ring.

We claim:

1. A self-cancel turn indicator switch arrangement for motor vehicles, comprising a housing, a rotatable steering column mounted within the housing, a switch ring mounted on the housing rotatable concentrically with said steering column in either direction from a neutral position, drive elements mounted on the steering column and rotatable therewith, said drive elements moving in a circular path adjacent the switch ring upon rotation of the steering column, two return fingers secured by pivot means to the housing adjacent the switch ring, means for selectively moving one of the fingers into the path of the drive elements when the switch ring is rotated in one direction from its neutral position comprising two abutments on the switch ring each adjacent one of the fingers, whereby upon rotation of the steering column in the said one direction a drive element pivotally moves aside the one finger and upon rotation of the steering column in the opposite direction a drive element moves the one finger against its adjacent abutment to return the switch ring to neutral position.

2. A self-cancel turn indicator switch arrangement for motor vehicles, comprising a fixed housing, a rotatable steering column mounted within the housing, a switch ring mounted on the housing rotatable concentrically with said steering column in either direction from a neutral position, drive elements mounted on the steering column and rotatable therewith, said drive elements moving in a circular path adjacent the switch ring upon rotation of the steering column, two return fingers secured by pivot means to the housing adjacent the switch ring, spring means connected to each of said fingers urging the fingers out of the path of the drive elements, means for selectively moving one of the fingers against its spring into the path of the drive elements when the switch ring is rotated in one direction from its neutral position comprising two abutments on the switch ring each adjacent one of the fingers, whereby upon rotation of the steering column in the said one direction a drive element pivotally moves the one finger against its spring and upon rotation of the steering column in the opposite direction a drive element moves the one finger against its adjacent abutment to return the switch ring to neutral position.

3. A self-cancel turn indicator switch arrangement as described in claim 1 in which each pivot means comprises a pin and slot connection whereby each finger is linearly displaceable.

4. A self-cancel turn indicator switch arrangement as described in claim 2 in which each return finger defines an elongated slot, and each pivot means comprises a pivot pin fixed to the housing and extending through the slot of the finger and means for resiliently biasing the finger in one direction longitudinally of the slot whereby the finger is linearly displaceable against the biasing means.

References Cited by the Examiner

UNITED STATES PATENTS

| | | | |
|---|---|---|---|
| 2,427,595 | 9/1947 | Fuller | 200—61 |
| 3,079,476 | 2/1963 | Dyksterhouse | 200—61 |

FOREIGN PATENTS

| | | |
|---|---|---|
| 74,071 | 11/1960 | France. |
| | | (Addition to No. 1,149,039) |
| 1,123,576 | 2/1962 | Germany. |

BERNARD A. GILHEANY, *Primary Examiner.*

ROBERT K. SCHAEFER, *Examiner.*